United States Patent [19]
Moghadam et al.

[11] Patent Number: 5,801,856
[45] Date of Patent: Sep. 1, 1998

[54] SECURE PHOTOGRAPHIC SYSTEMS

[75] Inventors: Omid A. Moghadam, Rochester; Majid Rabbani, Pittsford; Kevin A. Townsend, Brockport, all of N.Y.

[73] Assignee: Eastman Kodak Company, Rochester, N.Y.

[21] Appl. No.: 687,127

[22] Filed: Jul. 24, 1996

[51] Int. Cl.⁶ .................... H04N 1/04; G03F 3/10; G03B 17/24; G03B 27/32
[52] U.S. Cl. ................. 358/527; 358/487; 380/18; 355/39; 396/310; 396/311
[58] Field of Search ...................... 358/474, 487, 358/448, 527, 506; 396/310, 311, 319, 320; 355/39, 40; 380/18, 20

[56] References Cited

U.S. PATENT DOCUMENTS

| | | |
|---|---|---|
| 5,159,630 | 10/1992 | Tseng et al. ................. 380/18 |
| 5,499,294 | 3/1996 | Friedman .................... 380/18 |
| 5,552,897 | 9/1996 | Mandelbaum et al. ........ 358/400 |
| 5,581,613 | 12/1996 | Nagashima et al. ........... 380/18 |
| 5,644,120 | 7/1997 | Roy et al. ................... 396/562 |

OTHER PUBLICATIONS

Gary L. Friedman, "The Trustworthy Digital Camera: Restoring Credibility to the Photographic Image", *IEEE Transactions on Consumer Electronics*, vol. 39, No. 4, Nov. 1993, pp. 905–910.

*Primary Examiner*—Kim Yen Vu
*Assistant Examiner*—Kimberly A. Williams
*Attorney, Agent, or Firm*—Thomas H. Close

[57] ABSTRACT

A secure photographic system includes: a photographic film bearing an image and indicia representing a desired digital image security feature relating to the image; a scanner for scanning the image on the film to generate a digital image; means for detecting the indicia on the film to generate a security feature control signal; and digital image processing means responsive to the security feature control signal and the digital image for applying the desired digital image security feature to the digital image.

19 Claims, 3 Drawing Sheets

SECURE PHOTOGRAPHIC SYSTEMS

FIELD OF THE INVENTION

The invention relates generally to the field of photography, and in particular to systems for ensuring the integrity and authenticity of photographic images.

BACKGROUND OF THE INVENTION

Image scanning devices allow for images captured on a conventional silver halide medium to be digitized at a high resolution in a fairly inexpensive fashion. Systems like Kodak PhotoCD or Nikon CoolScan are two examples of such systems. The representation of images in digital form facilitates their storage, transmission, and processing. Digital networks continue to expand, further connecting computers, people and ideas around the globe. These facts, combined with the continued exponential growth in computing power, has expedited the proliferation of digital images in many diverse consumer, commercial, and scientific applications. The representation of images in digital form makes the storage, transmission, and manipulation of the image data extremely simple. Although an attractive feature from the standpoint of image processing, this also makes the digital image data extremely susceptible to unauthorized altering. It is a trivial task to access the individual pixels of an image and manipulate the image content in any desired way, thus making image integrity a real problem in those applications that critically depend on it. Similarly, unauthorized access to private images can occur by intercepting a transmission channel or intruding upon a digital data base. One solution to insuring the integrity of a digital image created in a digital camera is disclosed in the article *The Trustworthy Digital Camera: Restoring Credibility to the Photographic Image* by Friedman, IEEE Transactions on Consumer Electronics, Vol. 39, No 4, November 1993, pages 905–909. Friedman discloses the process of using a public-key cryptosystem to generate a digital signature for the image. The digital signature is generated by hashing the digital image and encrypting the hash using the private key of the public-key cryptosystem. Later, when the image is to be authenticated, the public key of the public-key cryptosystem is used to decrypt the digital signature, a new hash is made of the image and the decrypted signature is compared with the new hash. If the new hash matches the decrypted signature, the authenticity of the image is verified.

In applications where photographic film images are taken for the record, e.g., crime scenes, documentation of an inventory, or insurance claims, the existence of a means of authenticating the contents of the image after it has been digitized by a scanner is extremely desirable. For example, a photographic system wherein any tampering with a digital image produced from a photographic original, either film or print, can be easily proven would be valuable to the photojournalist or criminal investigator. As another example, consider a photographer who shoots a roll of film and sends it to the photofinisher for development, digitization, and storage in a common data base that is accessible to many users over ordinary dial-up telephone lines. It is often desirable to scramble (encrypt) the digital image in some form so that only the intended recipient(s) can decrypt it. Also, the photographer may wish to "sign" the digital image in a manner that allows her to prove authorship in support of a claim of copyright or to prove that a digital image has not been tampered with.

SUMMARY OF THE INVENTION

The present invention is directed to overcoming one or more of the problems set forth above. Briefly summarized, according to one aspect of the present invention, a secure photographic system includes: a photographic medium bearing an image and indicia representing a desired digital image security feature relating to the image; a scanner for scanning the image on the medium to generate a digital image; means for detecting the indicia on the medium to generate a security feature control signal; and digital image processing means responsive to the security feature control signal and the digital image for applying the desired digital image security feature to the digital image.

The system of the present invention has the advantage of providing for the security of a digital image produced from a photographic image by the photographer at the time that the original photographic image is produced.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

In one embodiment of the present invention, the security feature indicia simply instructs the photofinisher to apply a security feature. The security feature could be encryption for access control, or a digital signature for authentication to the digital image and may include a clear text message. For example in the case of a digital signature, the photofinisher will be the certifying authority for the authenticity of the image. Alternatively, the indicia may instruct the photofinisher to retrieve a personal security profile associated with the photographer which may contain instructions and/or keys for applying security features to the images. The personal security profile may be securely stored in a data base at the photofinisher site, or may be located in a remote data base which is accessed by the photofinisher and downloaded in a secure fashion to the photofinisher. An advantage of this embodiment is that the photographer is not burdened by the details of the security process such as generating keys for encryption or authentication.

In some cases, the photographer may want to have control over the specification of the private key of a private-key cryptosystem used for encryption or the keys of a public-key cryptosystem used for authentication. For example, the photographer may wish to have all of the images in a particular data base or storage medium encrypted with the same private key. Consequently, in another embodiment, the security feature indicia includes either the private key of a private-key cryptosystem used for encrypting the image or the private key of a public-key cryptosystem used for the signing of the image specified by the photographer.

A problem with the above embodiment is that the film carries the secret key, and if control of the film is lost, the security of the image cannot be guaranteed. To overcome this problem in yet another embodiment, the indicia includes either the private key of a private-key cryptosystem used for encrypting the image or the private key of a public-key cryptosystem used for the signing of the image, either or both of which have been encrypted by the public key of the photofinisher for added security.

Additionally, the photographer may request part or all of the secure information utilized in the execution of his security feature to be provided to him after the security feature has been applied to his images. For example, encryption keys can be securely conveyed to the photographer by encrypting them with the photographer's public key and sending them to the photographer. Alternatively, this information may be stored in the photographer's secure personal profile to which he has access or transmitted to him through other secure channels such as registered mail or a secure network connection.

Figure 1:
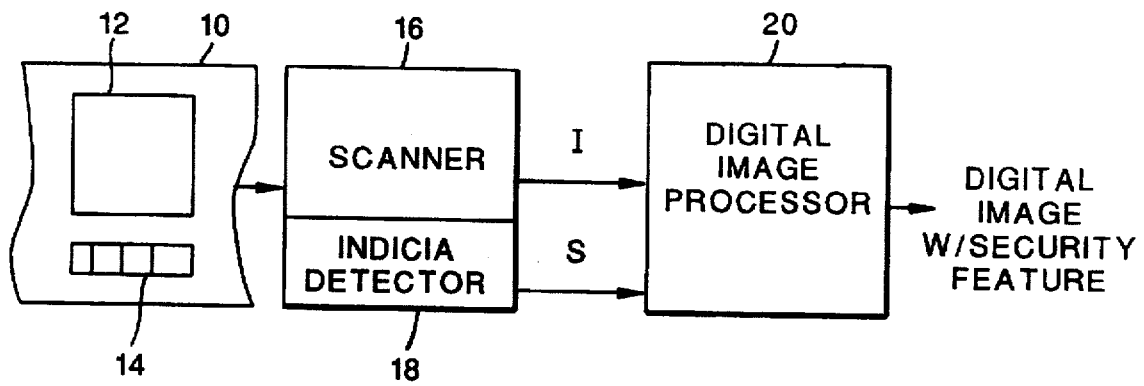
FIG. 1 is a schematic diagram illustrating a secure photographic system according to the present invention.

Referring to FIG. 1, an image bearing medium such as photographic film or print 10 includes an image 12 and indicia 14 representing a desired image security feature. The indicia 14 may be provided adjacent each image 12 on a film strip having many such images, or only once on the film 10 and may indicate a single security feature to be applied to all of the images on the film, or to a number of different security features applied selectively to images on the film. On a photographic print, the indicia may be provided on the back of the print. The indicia may be applied for example by apparatus in a camera or photographic printer, or by apparatus separate from a camera or printer, and may be applied by a photographer at the time of using the film, or by a factory at the time of making the film or paper. The indicia may take the form of, for example, exposed areas on the film, magnetic recording on a magnetic layer or track on the film or paper print, notches or holes punched in the film (such as in the non-image bearing borders of the film), or printing or code such as a bar code on the back of a photographic print. The indicia may include: instructions for particular security features; clear text messages to be included in a digital signature such as photographer identification information; unique camera identification code; encryption keys; or encrypted information.

The film 10 is supplied to a scanner 16 that scans the image 12 to generate a digital image I. An indicia detector 18 is provided for sensing the indicia representing the desired security feature and producing a signal S representing the desired security feature. The indicia detector 18 may comprise a character recognition portion in the scanner 16 if the indicia is optically detectable, or a separate detector such as a magnetic reader if the indicia is a magnetic marking on the film.

The digital image signal I and the security feature indicia signal S are supplied to a digital image processor 20 where the security feature is applied to the digital image. In a preferred embodiment of the present invention, the security feature indicia simply instructs the photofinisher to apply a security feature such as encryption for access control, or a digital signature for authentication to the digital image and may include a clear text message. For example in the case of a digital signature, the photofinisher will be the certifying authority for the authenticity of the image. In another embodiment, the security feature indicia includes either the private key of a private-key cryptosystem used for encrypting the image or the private key of a public-key cryptosystem used for the signing of the image. In yet another embodiment the indicia includes either the private key of a private-key cryptosystem used for encrypting the image or the private key of a public-key cryptosystem used for the signing of the image, either or both of which have been encrypted by the public key of the photofinisher for added security.

Figure 2:
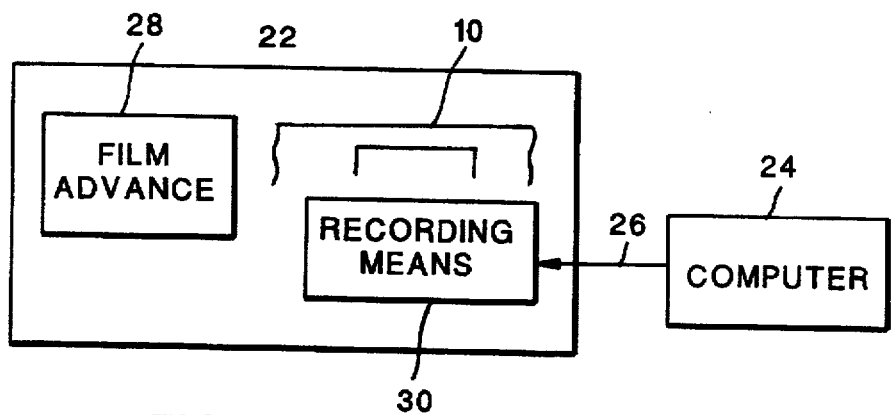
FIG. 2 is a schematic diagram showing a photographic camera having means for recording indicia on film useful with the present invention.

Referring to FIG. 2, apparatus for applying the security feature indicia to the film is shown. The apparatus includes a light tight enclosure 22, which may be: a camera with an attachable computer such as a Nikon N90 camera which can communicate with a Sharp Wizard pocket computer 24 via a PCMCIA connection 26; a camera having an onboard computer; or a separate light tight enclosure. A film advance mechanism 28 positions the film 10 with respect to a recording device 30 to record the security feature indicia on the film. If the security feature is a digital signature, the photographer may provide a clear text message via the computer 24 to be included as part of the digital signature. If the indicia includes encryption key(s), the computer 24 may contain a list of encryption keys or programs for generating such keys.

Figure 3:
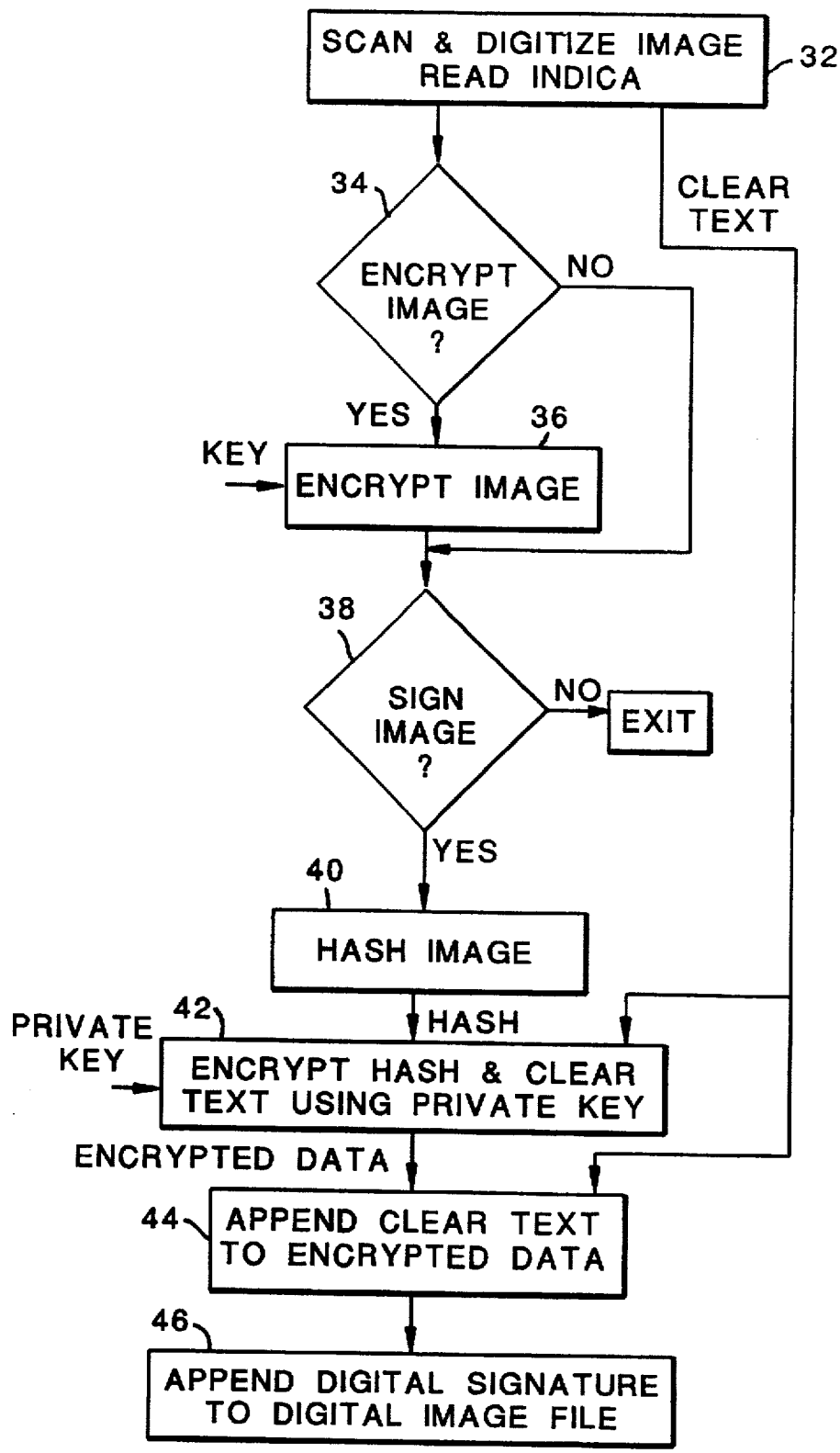
FIG. 3 is a flow chart illustrating a method of creating a secure image according to the present invention.

As shown in FIG. 3, after the film has been delivered to the photofinisher and processed, the images on the film are scanned and digitized, and the security related indicia is read 32 and supplied to the digital image processor 20 (see FIG. 1). The following functions are carried out by the digital image processor. A check 34 is made to determine if the image is to be encrypted. If so, the image is encrypted 36 using a key that is either supplied by the photofinisher or that was included in the security feature indicia, either in clear or encrypted form. The data is encrypted using an encryption algorithm such as the Data Encryption Standard (DES), see American National Private Sector Standard ANSI X3.92. Either the entire image may be encrypted, or only a portion thereof to render the image useless for a particular application. For example, the image may be encoded as multiple resolution versions, the information representing certain resolution versions is encrypted.

Next, a test is made 38 to determine if a digital signature is required. The original scanned digital image is hashed 40 using a known hashing algorithm. Examples of the technologies that can be used to create the digital signature are hashing functions such as the Secure Hash Algorithm (SHA) supplied by NIST (see Federal Information Processing Standard FIPS PUB 180-1, Apr. 17,1995). The private key of a public-key cryptosystem is employed to encrypt 42 the hash and any clear text supplied with the security feature indicia, using a public-key cryptosystem such as the RSA public-key algorithm (supplied by RSA Data Security Inc.) or a digital signature algorithm such as the Digital Signature Standard (DSS), see FIPS PUB 186, May 19, 1994, to create a digital signature. For convenience of the digital image user, an unencrypted version of the clear text may be appended 44 to the encrypted digital data to form the digital signature. The digital signature is then appended 46 to the digital data file containing the encrypted or unencrypted digital image.

Figure 4:
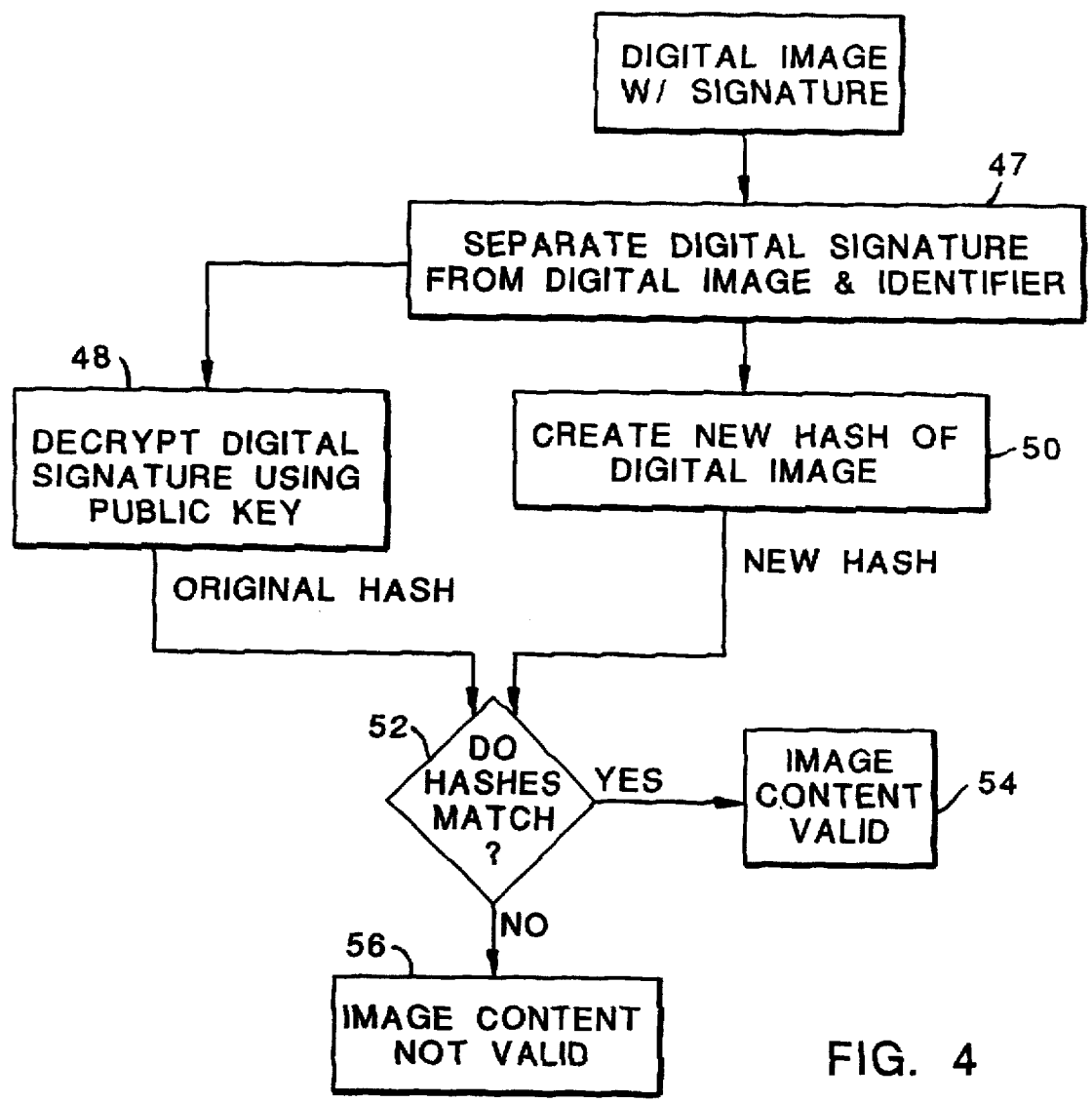
FIG. 4 is a flow chart illustrating a method of using the secure image generated according to the method shown in FIG. 3.

Subsequently, when it is required to verify the content of the digital image, the digital signature is separated 47 from the digital image, see FIG. 4. The verifier retrieves the public key associated with the certifying authority (for example the photofinisher or the photographer) and decrypts the digital signature to recover 48 the original hash. A new hash of the digital image is created 50 by the verifier and is compared 52 to the original hash. If the original and the new hash match 54, the content of the image is verified. If the new hash and original hash do not match, at least one bit of the image has been altered. Any information that the author provided as part of the clear text that was encrypted can be verified at this time.

Figure 5:
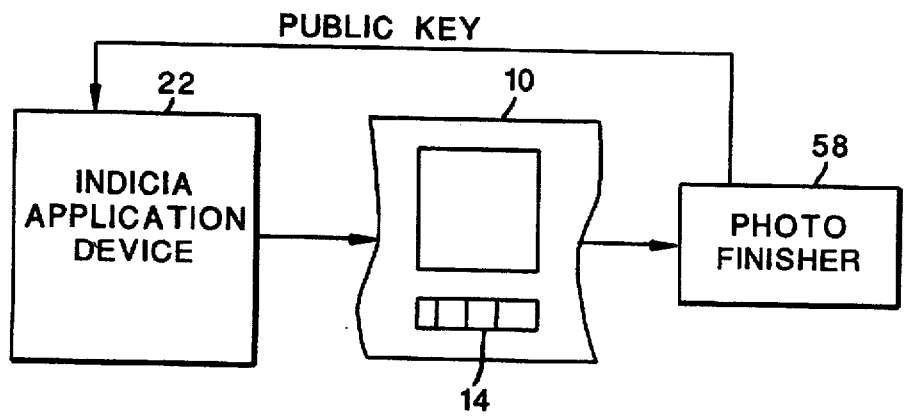
FIG. 5 is a block diagram illustrating an alternative embodiment of the present invention.

Referring to FIG. 5, the camera or accessory 22 with indicia marking capability acquires the public key of the destination photofinisher 58 prior to sending the film 10 to the photofinisher. Information disclosing the encryption keys is encrypted with the public key of the destination photofinisher 58 and this encrypted information is then used as the indicia 14 recorded on the film 10. The photofinisher 58 uses its private key that is matched to its public key and is stored securely at the photofinisher 58, to decrypt the indicia. This allows the photofinisher 58 to decrypt the photographer's encrypted encryption private key or signature private key and to use it to either encrypt the digital image or to sign the digital image as described above.

PARTS LIST

| | |
|---|---|
| 10 | image bearing medium |
| 12 | image |
| 14 | indicia |
| 16 | scanner |
| 18 | indicia detector |
| 20 | digital image processor |
| 22 | light tight enclosure |
| 24 | computer |
| 26 | PCMCIA connection |
| 28 | film advance mechanism |
| 30 | recording device |
| 32 | scan image and read indicia step |
| 34 | check for encryption step |
| 36 | encrypt image step |
| 38 | check for digital signature step |
| 40 | hash image |
| 42 | encrypt hash step |
| 44 | add clear test to encrypted data step |
| 46 | append digital signature to digital image step |
| 47 | separate digital signature from digital image step |
| 48 | decrypt digital signature step |
| 50 | create new hash step |
| 52 | check for hash match step |
| 54 | conclude image content valid |
| 56 | conclude image content not valid |
| 58 | photofinisher |

We claim:

1. A secure photographic system, comprising:
   a. a photographic original such as photographic film or paper bearing an image and indicia representing a desired digital image security feature to be applied to a digital image produced by scanning the image;
   b. a scanner for scanning the image on the photographic original to generate a digital image;
   c. means for detecting the indicia on the photographic original to generate a security feature control signal; and
   d. digital image processing means responsive to the security feature control signal and the digital image for applying the desired digital image security feature to the digital image.

2. The secure photographic system claimed in claim 1, further comprising:
   a. a photographic camera including means for applying indicia representing the desired digital image security feature relating to the image.

3. The secure photographic system claimed in claim 1, wherein the desired security feature is applying encryption to the image.

4. The secure photographic system claimed in claim 3, wherein the encryption is private-key encryption.

5. The secure photographic system claimed in claim 3, wherein the encryption is public-key encryption.

6. The secure photographic system claimed in claim 1, wherein the desired security feature is adding a digital signature to the image.

7. The secure photographic system claimed in claim 6, wherein the digital signature is based on a public-key cryptosystem.

8. The secure photographic system claimed in claim 7, wherein the digital image processing means includes:
   a. means for applying a hashing function to the digital image to produce an image hash; and
   b. means for encrypting the image hash using the private key of a public-key cryptosystem.

9. The secure photographic system claimed in claim 6, wherein the digital signature is based on the Digital Signature Standard DSS.

10. The secure photographic system claimed in claim 1, further comprising:
    a) means for securely conveying encryption key information to a user of the system.

11. The secure photographic system claimed in claim 10, wherein the secure conveying means employs a public key owned by a photographer.

12. The secure photographic system claimed in claim 1, wherein the indicia includes a set of image security keys.

13. The secure photographic system claimed in claim 12, wherein the security keys are encrypted by a public key owned by a photofinisher.

14. The secure photographic system claimed in claim 1, wherein the indicia is optically detectable.

15. The secure photographic system claimed in claim 1, wherein the indicia is magnetically detectable.

16. The secure photographic system claimed in claim 1, wherein the indicia is mechanically detectable.

17. A method of providing security to a photographic image, comprising the steps of:
    a. placing indicia representing a desired digital image security feature to be applied to a digital image produced by scanning the image on a photographic original such as photographic film or paper;
    b. scanning the image on the photogaphic original to generate a digital image;
    c. detecting the indicia on the photographic original to generate a security feature control signal; and
    d. applying the desired digital image security feature to the digital image.

18. The method claimed in claim 17, wherein the security feature is a digital signature and further comprising the steps of:
    a. hashing the digital image;
    b. providing a clear text; and
    c. encrypting the hash and the clear text using the private key of a public-key cryptosystem to produce the digital signature.

19. The method claimed in claim 18, further comprising the step of appending the clear text to the digital signature.

* * * * *